United States Patent [19]

Souchko

[11] Patent Number: 4,900,183

[45] Date of Patent: Feb. 13, 1990

[54] ASSEMBLY DEVICE

[76] Inventor: Alexandre Souchko, 16 Rue Danièle Cazanova, Roanna, France, 42300

[21] Appl. No.: 289,666

[22] Filed: Dec. 27, 1988

[30] Foreign Application Priority Data

Dec. 28, 1987 [FR] France .................... 87 18505

[51] Int. Cl.$^4$ ............................. B25G 3/36
[52] U.S. Cl. .................... 403/385; 403/390; 403/400
[58] Field of Search ............ 403/385, 400, 390

[56] References Cited

U.S. PATENT DOCUMENTS 1,706,215  3/1929  Davidson ................ 403/385 X
1,706,801  3/1929  Merrill .................... 403/385
4,566,819  1/1986  Johnston ................ 403/385

FOREIGN PATENT DOCUMENTS 633641  7/1936  Fed. Rep. of Germany .
429668  6/1935  United Kingdom ........... 403/385

Primary Examiner—Andrew V. Kundrat
Attorney, Agent, or Firm—Dowell & Dowell

[57] ABSTRACT

A device for assembling spaced structural elements which includes a first collar for cooperatively engaging a first structural element and an intermediate sole plate cooperatively engageable with the first collar and having an assembly member extending therefrom and which further includes a second collar for mounting to a second structural element and which second collar is selectively secured to the assembly member of the sole plate.

9 Claims, 5 Drawing Sheets

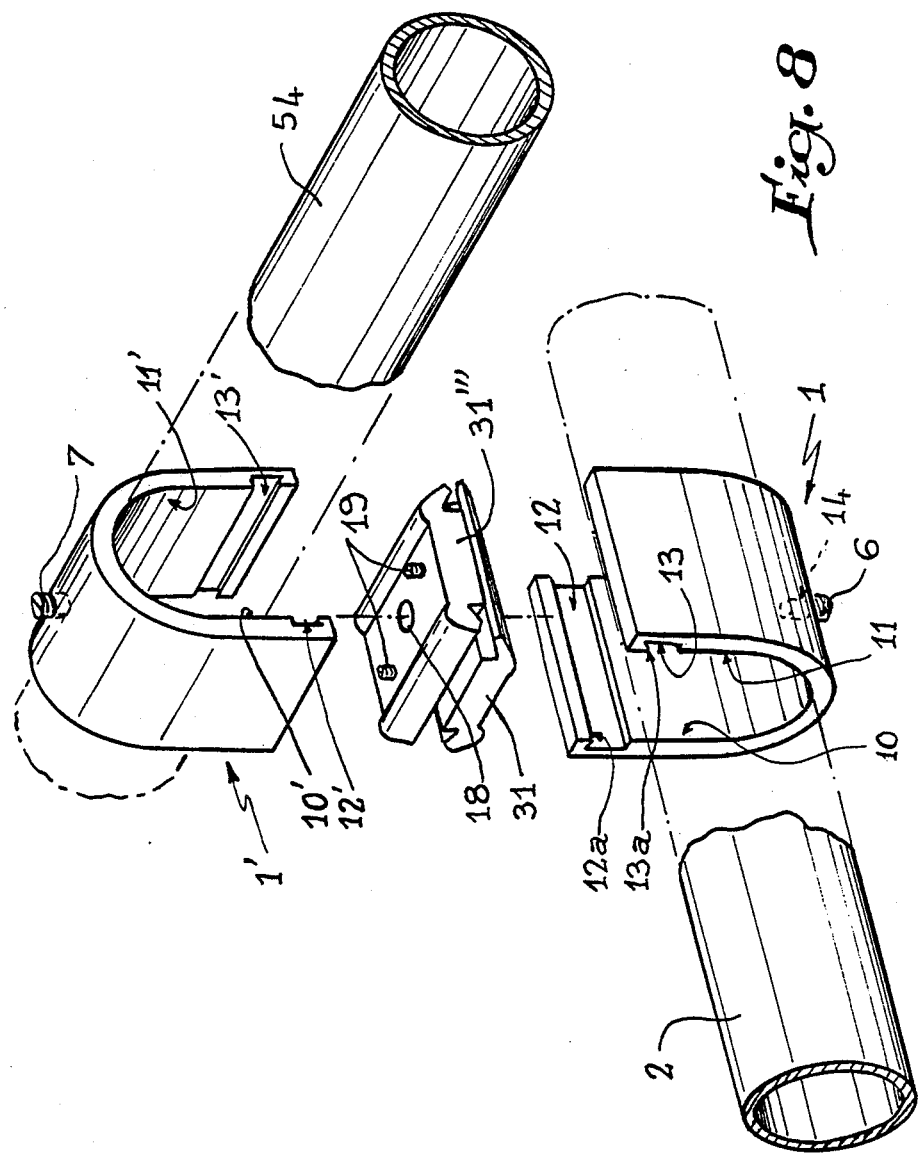

ASSEMBLY DEVICE

FIELD OF THE INVENTION

The present invention relates to the assembly of elements, and particularly of tubular sections.

BACKGROUND OF THE INVENTION

Devices are known to exist for assembling the tubes of scaffolding or the like, which make it possible to orient said tubes in multiple directions from the points of assembly. However, the assembly devices in question are provided only for the assembly of tubular elements, with the result that they do not allow the fixation of other accessories. Moreover, they are inaesthetic and they comprise screws or nuts which are visible and form obstacles which are inacceptable for applications other than those indicated above.

Document EP-A-O No. 092 668 describes a device for assembling two tubular elements comprising two collars in two parts joined by an intermediate member, so that the two tubular elements may be oriented in different manners. Such a device is complex, with the result that its cost is high, this very clearly limiting its possibilities of use. In addition, it comprises a large number of components, which renders manufacture costly.

Furthermore, systems of assembly are known, of which one of the collars takes the form of a U, such as the one described in document AU-A-25596. Such a collar does not make it possible to change the orientation of the two assembled tubular elements, with the result that it does not respond to all the needs in practice.

It is an object of the improvements forming the subject matter of the invention to overcome the drawbacks of the known assembly devices and to enable such devices to be produced which respond better than heretofore to the desiderata of the manufacturers of tubular assemblies, used in particular for the decoration of diverse spaces.

SUMMARY OF THE INVENTION

The purpose of the invention is obtained by means of an assembly device of the type comprising:

a first collar cooperating with a first element;

a second collar associated with a second element;

and an intermediate component joining the two collars;

said device being characterized in that the inner walls of the first collar which takes, in known manner, the form of a U, are each hollowed with a longitudinal groove in undercut in which is engaged a sole of the intermediate component, whilst means are associated with said component to cooperate with the second collar taking the form of a U.

BRIEF DESCRIPTION OF THE DRAWINGS

The invention will be more readily understood on reading the following description with reference to the accompanying drawings, in which:

FIG. 8 is a view similar to that of FIG. 1, but illustrating another variant embodiment.

DETAILED DESCRIPTION OF THE DRAWINGS

Figure 1:
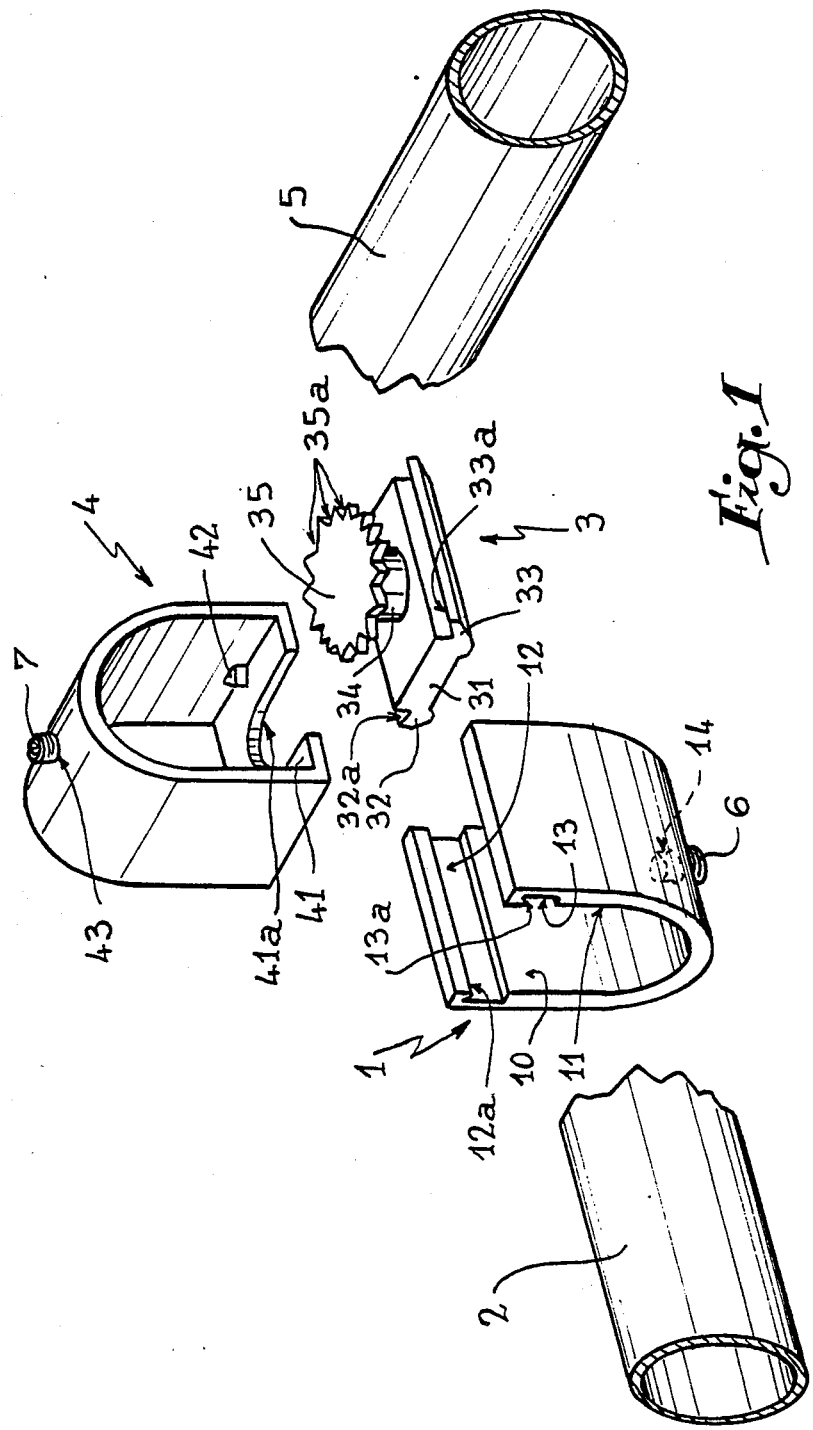
FIG. 1 is an exploded view of an assembly device according to the invention for assembling two tubular elements.

Referring now to the drawings, the device according to the invention, illustrated in FIG. 1, essentially comprises a first collar 1 capable of cooperating with a first element 2, provided to be tubular in the example shown, an intermediate component 3, a second collar 4 and a second element 5 adapted to be assembled with the first element 2, which, in this case, is in tubular form. The intermediate component is fastened, as will be better described hereinafter, on the one hand, to the first collar and, on the other hand, to the second.

The first collar 1 presents, in cross section, the form of a U of which the transverse web is curved so that it may surround the first element 2, the inner diameter of the collar 1 being substantially equal to the outer diameter of element 2. The two inner walls 10, 11 of the arms of the collar 1 are each hollowed with a longitudinal groove 12, 13 respectively, located opposite each other and which determine a slideway. The upper face 12a, 13a of each groove is provided to be oblique so as to lie in undercut. The centre of the web of the collar 1 is provided with a tapped hole 14 in which is engaged a locking screw 6.

The collar 1 is advantageously made by cutting a section of light metal or of plastics material made by extrusion, each section presenting a length slightly greater than the distance between its arms.

The intermediate component 3 comprises a generally flat sole plate 31 whose two lateral edges form a longitudinal lip 32, 33 whose upwardly turned face 32a, 33a presents the same inclination as faces 12a, 13a of the grooves 12, 13 of the collar 1. In this way, the sole plate 31 may be engaged in the slideway formed by said grooves, so that it lies above element 2 when the latter is engaged in collar 1. It will be readily understood that, in these conditions, the grooves 12 and 13 must lie in the vicinity of the edge of the arms of the collar 1. Screwing of the locking screw 6 in the tapped hole 14 in the collar 1, causes gripping of the tube between the sole plate 31 of the component 3 and the screw, so as to lock the component 3, the collar 1 and the element 2.

At the centre of the sole plate 31 stands a cylindrical stud or stand 34 of low height and on the end of which is provided an assembly member 35 in the form, in the example of FIG. 1, of a disc whose periphery is provided with notches 35a.

Figure 4:
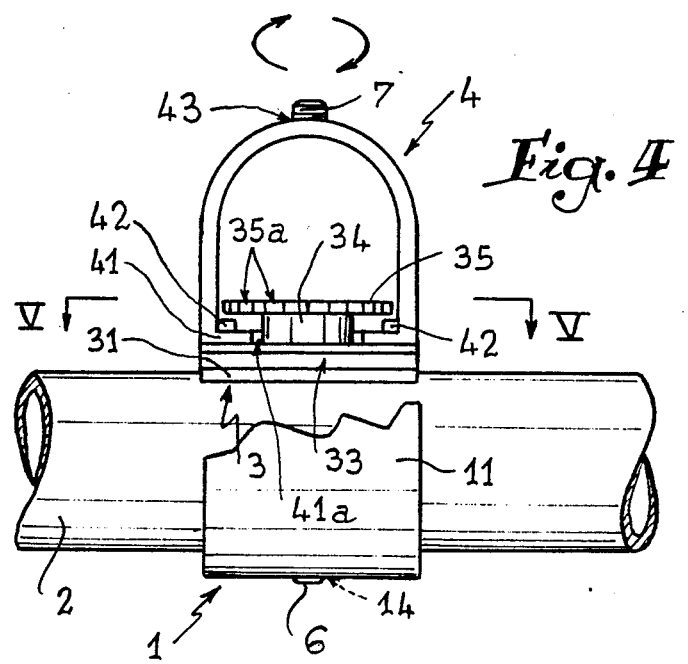
FIG. 4 is a view similar to that of FIG. 3, but showing the device according to the invention in the course of being mounted.
Figure 3:
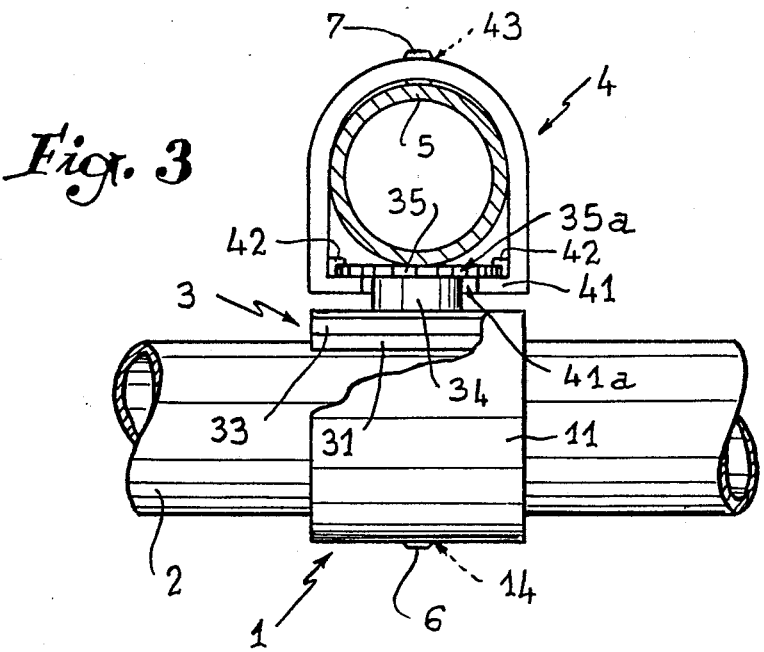
FIG. 3 is a side view of the device according to the invention, with parts torn away.
Figure 5:
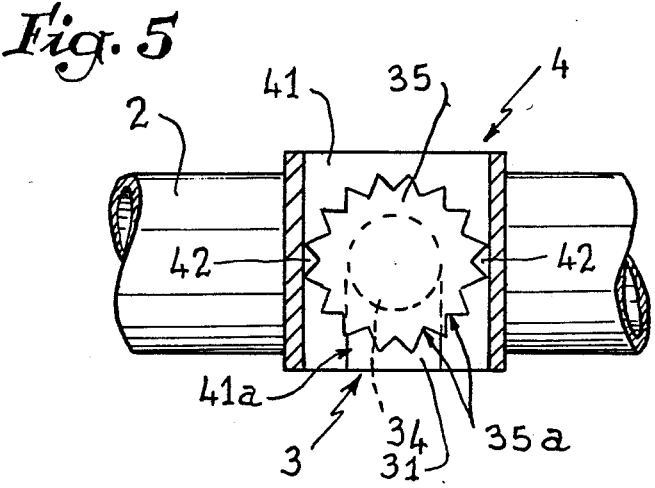
FIG. 5 is a section along V—V (FIG. 4).

The shape of the second collar 4 is similar to that of collar 1, but the free edges of its two arms are joined by a base 41 in which a notch 41a is made, whose width is very slightly larger than the diameter of the stud 34, so that the latter can be engaged in the collar and taken to the centre thereof. In this position, if the sole plate 31 is applied against the outer face of the base 41, the disc 35 lies above the upper face of the base so as not to enter into contact with two teeth 42 disposed one opposite the other at the bottom of each arm of the collar and on the upper face in question of the base 41 (FIG. 4). If the intermediate component 3 is moved downwardly (FIG. 3), the teeth 42 penetrate in two diametrically opposite notches 35a of the disc 35, with the result that the component may thus be oriented in any desired direction (FIG. 5). The collar 4 also comprises a tapped hole 43 disposed in the centre of its transverse web and in which a screw 7 may be engaged.

It will readily be understood how mounting is effected. After the element 2, the collar 1 and the intermediate component 3 have been assembled as indicated hereinabove, and after the intermediate component 3 has been oriented with respect to collar 4, it suffices to engage the tube 5 in the latter and to screw the locking screw 7, to connect the whole.

Figure 2:
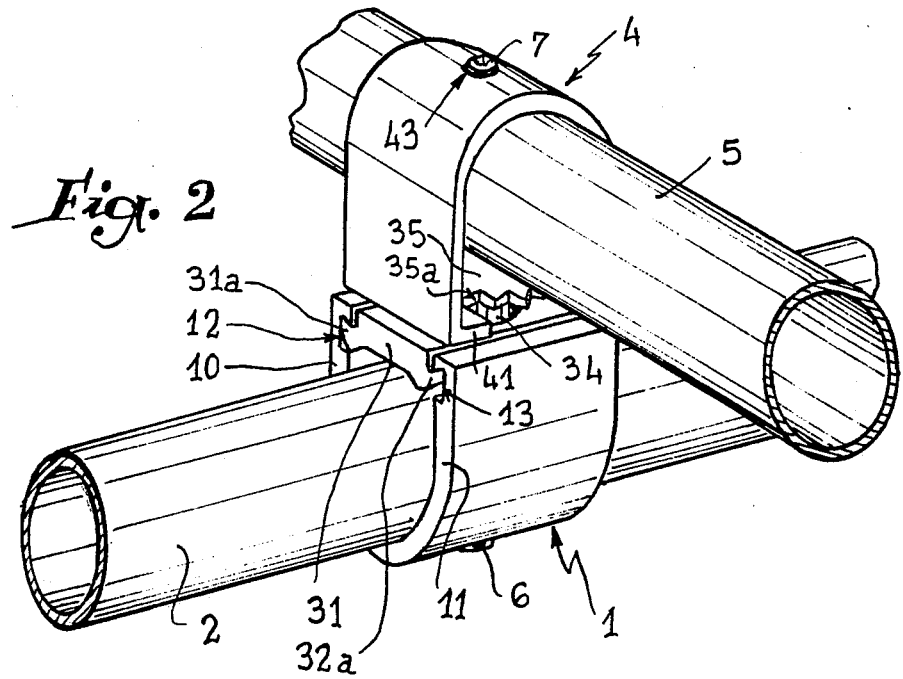
FIG. 2 is a view of the device according to the invention in the mounted state and adapted to assemble two orthogonal tubular elements.

The assembly illustrated in FIG. 2 is thus obtained, element 5 being pressed by the locking screw 7 against the disc 35 so as to lock the latter against the sole plate 31, with the result that elements 2 and 5 are thus rigidly assembled. This position of locking of the element 5 with respect to collar 4 is particularly well illustrated in FIGS. 3 and 5.

Figure 6:
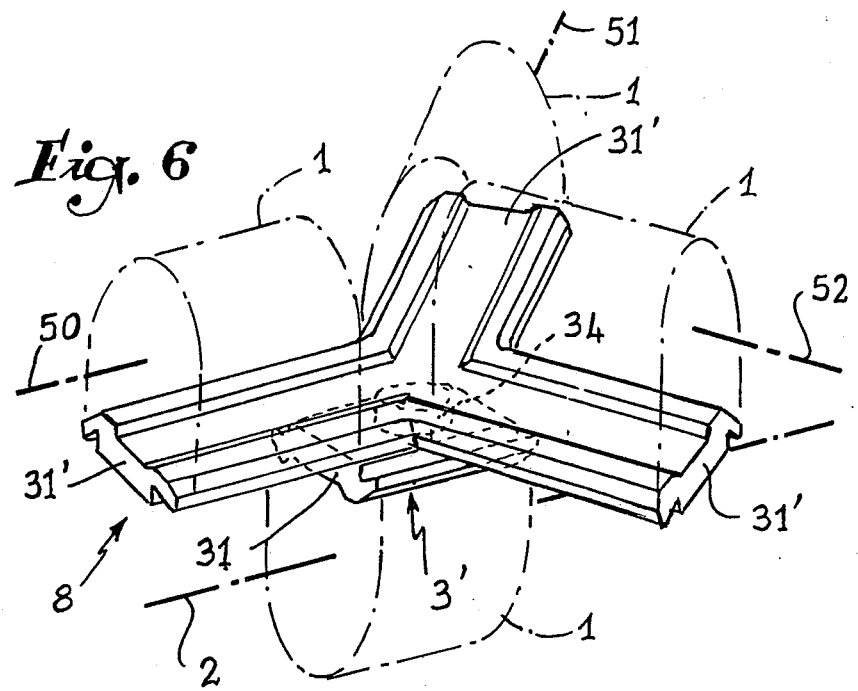
FIGS. 6 and 7 illustrate in perspective variant embodiments of the intermediate component of the assembly device according to the invention.

Of course, the assembly member 34–35 may take any desired form for the purpose of assembling element 2 with other elements such as a plurality of tubular elements illustrated at 50, 51, 52. FIG. 6 illustrates an intermediate component 3' composed of the sole plate 31 of the component 3 surmounted by the stud 34 at the free end of which is placed the centre of a multi-armed star plate 8 of which each of the arms 31' takes a shape similar to that of the sole plate 31. In this way, the sole plate cooperates with a collar 1 in the manner indicated hereinabove and the arms of the star plate 8 are associated in the same manner with three collars 1, with the result that the first element 2, whose axis is illustrated, may be assembled with three tubular elements 50, 51, 52 determining therebetween an angle of 120° or other.

Figure 7:
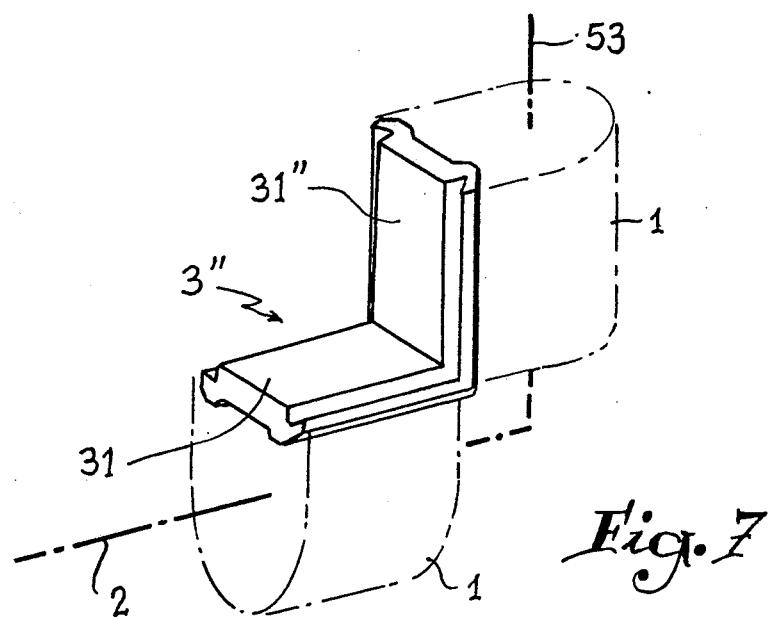

In FIG. 7, the intermediate component 3' comprises a sole plate 31 at the end of which is placed a second sole plate 31'' identical to the first and oriented perpendicularly thereto, so that two tubular elements 2–53, whose axes are illustrated and which are oriented perpendicularly to each other in the same plane, may be assembled together.

FIG. 8 shows a variant embodiment in which enable the intermediate component 3 to cooperate with the secod collar 4 of FIG. 1 more simply and more economically. To that end, the second collar 4, given reference 1', is similar to collar 1, i.e. the two inner walls 10', 11' of its two arms comprise longitudinal grooves 12', 13'. The means for assembling the intermediate component 3 and the collar 1' is constituted by a sole plate 31''' similar to sole plate 31. The two sole plates 31 and 31''' are connected by a pin 18 secured with one of them and with respect to which the second 31''' may move angularly.

Sole plate 31''' is to that end provided with two locking screws 19 acting on the sole plate 31 to determine the desired angular position of the two sole plates. The orientation of elements 2 and 54 may thus be set at any desired angle.

It goes without saying that the intermediate component may comprise any assembly member without departing from the domain of the invention; for example, it may be in the form of a clamp for a panel or any other arrangement.

What is claimed is:

1. A device for assembling space structural elements comprising a first generally U-shaped collar having an intermediate portion and leg portions, said leg portions having opposing inner surfaces, opposing grooves formed along said inner surfaces of said leg portions so as to extend longitudinally with respect to said first collar, each of said grooves having a beveled face which is undercut with respect to said inner surfaces of said leg portions, a first of the structural elements being selectively receivable within said first collar and intermediate said leg portions, first securing means carried by said first collar for securing the first structural element thereto, an intermediate sole plate having upper and lower surfaces and a pair of outer edges which are of a shape to be cooperatively seated with said opposing grooves in said first collar, an assembly member secured to said upper surface of said sole plate, a second generally U-shaped collar having opposing leg portions having outermost ends, said assembly member being selectively mounted intermediate said leg portions of said second collar and adjacent said outermost ends thereof, a second structural element being selectively receivable within said second collar, and second securing means carried by said second collar for securing the second structural element to said second collar.

2. The device of claim 1 including a stud member mounted to said upper surface of said sole plate, said assembly member being mounted to said stud member, said assembly member including a generally circular disk element having an outer periphery, and a plurality of spaced notches formed in said outer periphery of said disk.

3. The device of claim 2 in which said second collar includes a plate element extending between said outermost ends of said leg portions, an opening formed in said plate element through which said stud member is selectively received, and a pair of spaced teeth mounted to said plate element, said spaced teeth being of a size to be cooperatively received within said notches of said disk.

4. The device of claim 1 in which said assembly member includes a second sole plate having a pair of spaced outer edges, said second collar having a pair of spaced groves formed adjacent said outermost ends of said leg portions, and said spaced outer edges of said second sole plate being cooperatively seated within said spaced grooves of said second collar.

5. The device of claim 4 in which said first and second sole plates are adjustably connected by a pin means.

6. The device of claim 4 in which each of said leg portions of said second collar include inner surfaces, said spaced grooves having a beveled face which is undercut with respect to said inner surfaces of said leg portions of said second collar, and said outer edges of said second plate being cooperatively configured with respect to said spaced grooves.

7. The device of claim 1 in which said assembly member includes a plate having a plurality of outerwardly extending leg segments, each of leg segments having a pair of side edges, said leg portions of said second collar including inner surfaces, a pair of spaced grooves formed along said inner surfaces of said leg portions of said second collar and said outer edges of said leg segments of said plate being cooperatively receivable within said spaced grooves of said second collar.

8. The device of claim 7 in which each of said grooves in said leg portions of said second collar include a beveled face which is undercut with respect to said inner surfaces of said leg portions thereof, said edge portions of said leg segments of said multi-leged plate being cooperatively configured with respect to said grooves in said leg portions of said second collar.

9. The device of claim 5 including means for selectively securing said first and second sole plates in angular relationship with respect to one another.

* * * * *